H. ARMSTRONG.
PAN REMOVER.
APPLICATION FILED APR. 23, 1910.

980,735.

Patented Jan. 3, 1911.

Witnesses
W. S. McDowell.
John A. Dinegan.

Inventor
Hannah Armstrong
By Victor J. Evans
Attorney

UNITED STATES PATENT OFFICE.

HANNAH ARMSTRONG, OF MOUNT JACKSON, VIRGINIA.

PAN-REMOVER.

980,735.  Specification of Letters Patent.  Patented Jan. 3, 1911.

Application filed April 23, 1910. Serial No. 557,268.

*To all whom it may concern:*

Be it known that I, HANNAH ARMSTRONG, a citizen of the United States, residing at Mount Jackson, in the county of Shenandoah and State of Virginia, have invented new and useful Improvements in Pan-Removers, of which the following is a specification.

This invention relates to improvements in kitchen articles and has particular reference to a device adapted to remove baking pans from an oven.

One object of the invention is the provision of a pan remover provided at one end and on a portion of one side with a flange operating to prevent the pan from sliding after the same has been positioned in the remover and withdrawn from the oven.

Another object is the provision of a means for placing the pan onto the device while the pan is within the oven.

With these and other objects in view, which will more fully hereinafter appear, the present invention consists in certain novel details of construction and arrangement of parts, hereinafter fully described, illustrated in the accompanying drawings, and more particularly pointed out in the appended claims; it being understood that various changes in the form, proportion, size, and minor details of the device may be made, within the scope of the appended claims, without departing from the spirit or sacrificing any of the advantages of the invention.

Figure 1:
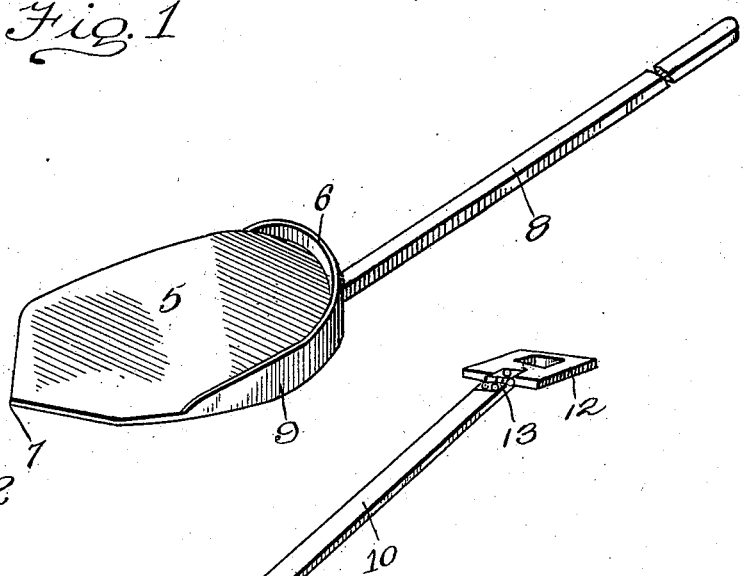
Figure 2:
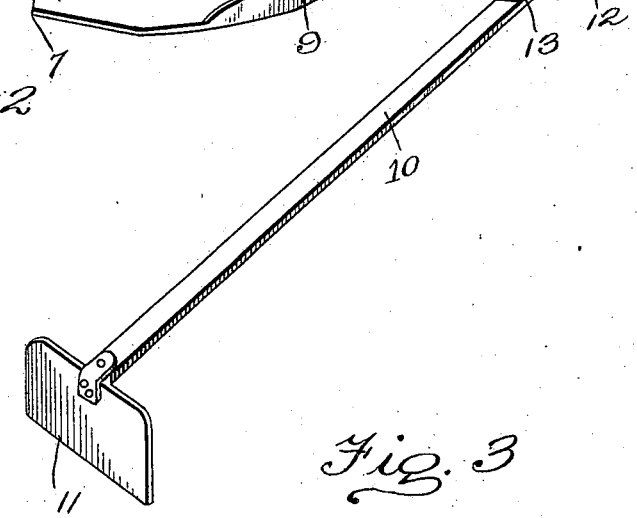
Figure 3:
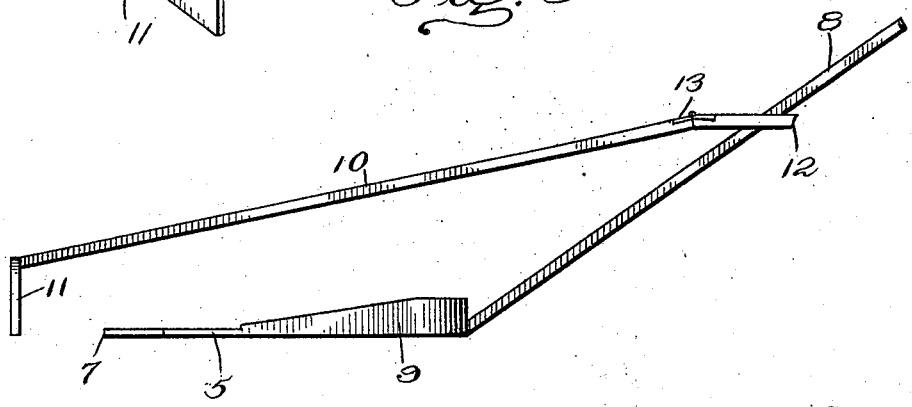

In the accompanying drawings, forming a part of the specification;—Figure 1 is a perspective view of the remover. Fig. 2 is a similar view of the member for moving the pan onto the remover. Fig. 3 is a side elevation of the parts assembled.

Similar numerals of reference are employed to designate corresponding parts throughout.

The member for carrying the pan from the oven is shown to include in its construction an oblong plate designated by the numeral 5, one end of said plate being rounded, as shown at 6, while the opposite end is pointed, as shown at 7. Extending upwardly and outwardly from the medial portion of the rounded end is a handle 8, said handle 8 being rectangular in cross section and of any convenient length. Flanking the rounded end 6 is a guard or flange 9, this member being arranged on the upper face of the plate and having one end extending to the medial portion of one side of the plate, while its opposite end extends to the juncture between the opposite side and one side of the curved end. With this construction it will be manifest that a pan located on the plate 5 and bearing on the guard or flange 9 will, by virtue of the latter be prevented from sliding off the end of the plate when the latter is tilted. Owing to the disposition of the guard or flange, it will be evident, however, when the plate is tilted to one side that the pan thereon will readily slide from the plate and onto the table or other place to be cooled.

In order that the hot pan, while in the oven, may be readily moved onto the plate 5 without forcing the pointed end of the latter below the bottom of the pan the following construction is employed: By reference now to the drawings it will be seen that a member corresponding in configuration to an ordinary hoe is shown to include a handle portion 10 corresponding in length approximately to the length of the handle 8 terminating at one end in the usual blade 11 arranged perpendicular to the handle. The opposite end of the handle is provided with an extension 12, said extension 12 being connected with the handle by means of a hinge 13 and having a rectangular-shaped opening of a size to loosely receive the handle 8. With this construction it will be manifest, when the opening of the extension receives the handle 8 and the said extension is moved in the handle that the blade 11 may be moved in advance of the pointed end of the plate 5, and raised to any required height, so that when the pointed end is placed in juxtaposition to a pan in the oven and the blade placed on the opposite side of the pan and lowered into engagement with the floor of the oven that a movement of the handle 10 longitudinally and in the direction of the free end of the handle 8 will result in moving the hot pan onto the plate 5, after which the device may be taken from the oven in assembled form together with the pan on the plate 5.

From the foregoing, it is evident that I have provided a device which is comparatively simple in structure and inexpensive in manufacture, embodying few parts and these so arranged that the danger of derangement will be reduced to a minimum.

I claim:—

1. A kitchen utensil comprising a plate, a handle arranged at one end of the plate and inclining upwardly and outwardly therefrom, and a hoe including a handle having one end slidingly fitted on the first-named handle, for the purposes described.

2. A kitchen utensil comprising a plate, a handle arranged at one end of the plate and inclining upwardly and outwardly therefrom, and a hoe having a handle including a plurality of pivoted sections, one of which is provided with an opening for the loose reception of the first-named handle.

In testimony whereof I affix my signature in presence of two witnesses.

HANNAH ARMSTRONG.

Witnesses:
O. L. BURKETT,
Mrs. E. M. HICKMAN.